United States Patent [19]

Azzara

[11] Patent Number: 5,472,176
[45] Date of Patent: Dec. 5, 1995

[54] SILVER RECOVERY DEVICE

[75] Inventor: Jerome A. Azzara, Spartanburg, S.C.

[73] Assignee: Fabrikan Company, Spartanburg, S.C.

[21] Appl. No.: 270,050

[22] Filed: Jul. 1, 1994

[51] Int. Cl.⁶ .................................................. C22B 13/08
[52] U.S. Cl. ........................................ 266/170; 266/101
[58] Field of Search ................................... 266/101, 170

[56] References Cited

U.S. PATENT DOCUMENTS

| | | | |
|---|---|---|---|
| 3,630,505 | 12/1971 | MacKay | 266/170 |
| 3,692,291 | 9/1972 | MacKay | 266/170 |
| 3,840,217 | 10/1974 | MacKay | 266/170 |
| 4,441,697 | 4/1984 | Peterson et al. | 266/170 |
| 4,523,993 | 6/1985 | Farber | 266/170 |
| 4,662,613 | 5/1987 | Woog | 266/170 |
| 4,740,244 | 4/1988 | Williams | 266/170 |
| 4,854,552 | 8/1989 | Williams | 266/170 |
| 5,004,212 | 4/1991 | Gutierrez | 266/170 |
| 5,026,029 | 6/1991 | Peterson | 266/170 |
| 5,112,390 | 5/1992 | MacKay | 266/170 |
| 5,298,170 | 3/1994 | Woog | 266/170 |
| 5,310,629 | 5/1994 | McGuckin | 266/170 |

FOREIGN PATENT DOCUMENTS 393201  2/1985  Canada .

OTHER PUBLICATIONS

Kodak Chemical Recovery Cartridge, Model II, Kodak Publication No. J–19 Published by Eastman Kodak Company, 1990, pp. 1–13.

Two photographs of a silver recovery device with accompanying letter.

*Primary Examiner*—Peter D. Rosenberg
*Attorney, Agent, or Firm*—Dority & Manning

[57] ABSTRACT

A silver recovery device for recovering silver from photographic fluid is provided. The silver recovery device includes an outside container having a fluid inlet and a fluid outlet. The fluid inlet has an extension tube which causes the entering fluid to fall upon a silver recovery cartridge. The silver recovery cartridge generally includes compressed steel wool surrounded by an outside liner. The steel wool reacts with the silver contained within the photographic fluid. The silver recovery cartridge can also include baffle plates for further dispersing the fluid as it filters through the steel wool. The silver recovery cartridge is supported within the outside container by a support grid. The support grid allows fluid to filter through the cartridge and then flow out the fluid outlet.

22 Claims, 3 Drawing Sheets

SILVER RECOVERY DEVICE

BACKGROUND OF THE INVENTION

The present invention generally relates to a silver recovery device and more particularly to an apparatus which recovers silver contained within photographic developing fluids such as fixers and developers.

Photographic films including photographic paper typically comprise a base material coated with a light-sensitive emulsion. The emulsion normally contains various silver salts and silver halides. During the developing process, the films are placed in various solutions that chemically react with the emulsion layer in order to develop an image. During this process, some of the silver salts and silver halides become dissolved or suspended within the solutions. For instance, one type of film developing solution, called a fixer, is specifically used to dissolve out any silver halides that were not exposed when the picture or image was taken.

Once these solutions become spent, it is desirable to recover the silver contained therein for two important reasons. First, the silver that can be recovered from photographic developing solutions is very valuable. Silver, which is considered a precious metal, has many uses and applications while being very expensive to obtain. Even recovering small amounts of silver in developing solutions can be economically advantageous.

The second reason to remove silver from photographic solutions, and perhaps more importantly, is that the silver containing solutions are considered pollutants. In fact, in many areas the silver concentration of the solution must be below five parts per million before the solution is considered safe for disposal. As such, recovering the silver from photographic developing solutions is environmentally necessary.

In the past, others have attempted to develop various devices for recovering silver from spent, photographic processing fluids. For instance, U.S. Pat. No. 5,004,212 to Gutierrez discloses a canister for the recovery of silver from silver-containing waste fluids. The canister includes an inner and an outer element, each removable from the other. The inner element has a necked top matable to a bottom container. The bottom container includes at least one foot and has a plurality of holes located on the bottom to permit fluid to rise from the bottom to the necked top. Fluid enters the canister, flows to the bottom, rises within the inner element and then exits out an exit mating means connected to the necked top. The inner element contains a silver recovery media such as steel wool in addition to small amounts of copper or cadmium salt. When the waste solution enters the canister, a chemical replacement reaction occurs between the silver contained in the solution and the iron contained within the steel wool.

In U.S. Pat. No. 4,441,697 to Peterson et al., a silver recovery unit is disclosed. The device includes a container having influent and effluent passageways and a filler element composed of a metal above silver in the electromotive force series. The filler may be formed of steel wire wound in the fashion of a spool about a core. The core is connected to the effluent and has an aperture in the side thereof. A splash guard is connected to the core above the filler material and serves to disperse fluid entering the container so that the fluid is distributed generally about the interior of the vessel. One or more verticle baffles may be situated within the filler to extend the length of the path taken by fluid flowing from the effluent passageway through the filler to the core. In general, fluid enters the container, surrounds the filler material and flows therein entering the core and exiting through the effluent passageway.

An apparatus and process for the recovery of silver from spent waste, acidic processing fluids are disclosed in U.S. Pat. Nos. 4,854,552 and 4,740,244, both to Williams. The apparatus includes a vessel having a flat bottom and a top. A plate is located in the bottom of the vessel capable of distributing the fluid to ensure even flow while finely divided iron is contained within the vessel. An inlet and an outlet to the vessel are arranged so that processing fluid will enter the vessel through the inlet, flow under the bottom plate, and flow through the finely divided iron prior to exiting through the outlet. Minor amounts of copper and cadmium salts can also be dispersed throughout the finely divided iron.

Devices for recovering silver from a silver containing solution are also disclosed in U.S. Pat. Nos. 3,692,291 and 3,840,217, both to MacKay. In the '217 patent, the silver recovery equipment disclosed therein includes a plastic container and rotatable spaced T-connectors comprising an influent liquid passage and an effluent liquid passage. A transparent U-shaped tube with an elevated aperture spans between the two T-connectors and provides a path for any overflow liquid. A recovery element made of a metal above silver in the electromotive force series sits within the container and has a hollow cylindrical axis and is in liquid communication with the effluent passage. The recovery element is supported on a pedestal of wood within the container. Fluid flows in through the influent passage, penetrates the recovery element, and then flows up the hollow axis to the effluent passage.

Other equipment and methods for recovering silver from a silver containing solution are disclosed in U.S. Pat. No. 3,630,505 to MacKay.

Although the prior art discloses numerous silver recovery devices and methods, aspects and features of the present invention remain absent. In particular, the prior art teaches forward flow systems in which fluid enters and circulates within a container and then is drawn up through a silver recovery element before being discharged. The prior art is generally deficient in providing a reverse flow system in which the solutions flow down through silver recovery media and then out an effluent channel.

The prior art is also generally deficient in providing a silver recovery unit that remains active and efficient for an extended period of time. Also, some of the prior art constructions are not capable of removing and recovering silver from waste fluids in concentrations sufficient to meet many Federal discharge regulations.

Many prior art devices disclose adding copper or cadmium salts to the silver recovery media in order to improve silver recovery. However, these salts can be environmentally hazardous and can, in fact, lower the efficiency and the life of the device in lower and intermittent flow rate situations. Such salts are not necessary in the device of the present invention.

The prior art is also generally deficient in providing a silver recovery unit that can process waste solutions used in developing color photography. In the past, silver recovery units have been limited in their application to black and white developing solutions only.

SUMMARY OF THE INVENTION

The present invention recognizes and addresses the foregoing disadvantages, and others of prior art constructions and methods.

Accordingly, it is an object of the present invention to provide an improved silver recovery cartridge for recovering silver from photographic processing solutions.

It is another object of the present invention to provide a silver recovery device that has a longer useful life.

It is another object of the present invention to provide a silver recovery cartridge that is capable of recovering silver from color photography processing fluids.

Another object of the present invention is to provide a silver recovery device that processes silver containing solutions in a reverse flow arrangement.

Still another object of the present invention is to provide a silver recovery cartridge that contains concentric baffles in order to divert flow in multiple directions through a silver recovery media.

It is a further object of the present invention to provide a silver recovery device wherein a silver recovery media is press fit into an elastic liner for preventing channeling of the fluid and for improving performance.

These and other objects of the present invention are achieved by providing a device for recovering silver from fluids which contain silver therein. The device includes an outside container defining a fluid inlet and a fluid outlet. A silver recovery cartridge is positioned within the outside container such that a space is defined between the cartridge and the container. The cartridge is positioned in relation to the fluid inlet so that fluid entering the outside container will contact the cartridge.

The silver recovery cartridge includes an elastic tubular liner having an open top and an open bottom. The liner surrounds a silver recovery element containing a metal above silver in the electromotive force series which includes any metal that will undergo a replacement reaction with silver. The silver recovery cartridge is supported on a support means within the outside container. The silver recovery device has a reverse flow arrangement wherein fluid enters the outside container through the fluid inlet, filters down through the silver recovery cartridge, flows up within the space between the cartridge and the container, and then exits outside the container through the fluid outlet.

In one particular embodiment, the outside container described above can have a volume up to about 12 gallons and can have a removable and sealable lid. The silver recovery device can further include a fluid dispersing means in communication with fluid entering the fluid inlet for dispersing the fluid in multiple directions before contacting the silver recovery cartridge. In one embodiment, the fluid dispersing means can include an extension tube extending from the inlet to the center of the silver recovery cartridge and a drip plate located below the extension tube. In this embodiment, fluid enters the inlet, flows through the extension tube, and contacts the drip plate before falling upon the silver recovery element.

In a preferred embodiment, the silver recovery element comprises compressed steel wool that has been press fit into the elastic liner. In particular, the steel wool is preferably grade 4.

The silver recovery device can also include baffle means for deflecting and dispersing the fluid as it filters through the silver recovery device. The baffle means can include a coaxial plate having a centrally located cut-out portion contained within the silver recovery element.

In an alternative embodiment, the silver recovery device of the present invention can include an outside container defining a fluid inlet that is adapted to receive a respective inlet hose for carrying fluid to the container. A silver recovery element is enclosed within the outside container. The silver recovery element has a top and a bottom and is positioned within the container such that fluids entering the fluid inlet fall upon the top of the recovery element. In particular, the silver recovery element is made from a compressed steel wool, wherein, when fluid filters through the element, the silver contained within the fluid undergoes a replacement reaction with iron contained within the steel wool.

The device can also include a fluid dispersing means in communication with the fluid entering the fluid inlet for dispersing the fluid in multiple directions before the fluid contacts the silver recovery element. An elastic tubular liner surrounds and applies a compressive force to the silver recovery element maintaining fluid within the recovery element as the fluid filters therethrough.

A support grid is located on the bottom of the container for supporting the silver recovery element. As fluid filters through the recovery element, the fluid flows through the grid and outside the tubular liner. A fluid outlet is positioned on the outside container and is adapted to receive an outlet hose. The fluid outlet is located on the container at a predetermined height below the top of the tubular liner.

Alternatively, the device can include a system of baffles for deflecting and dispersing the fluid as it filters through the silver recovery element. The baffles can include alternating plates and circular disks having centrally located cut-out portions. When installed, the baffles cause the fluid to flow inwardly and outwardly as it filters through the silver recovery element.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Figure 1:
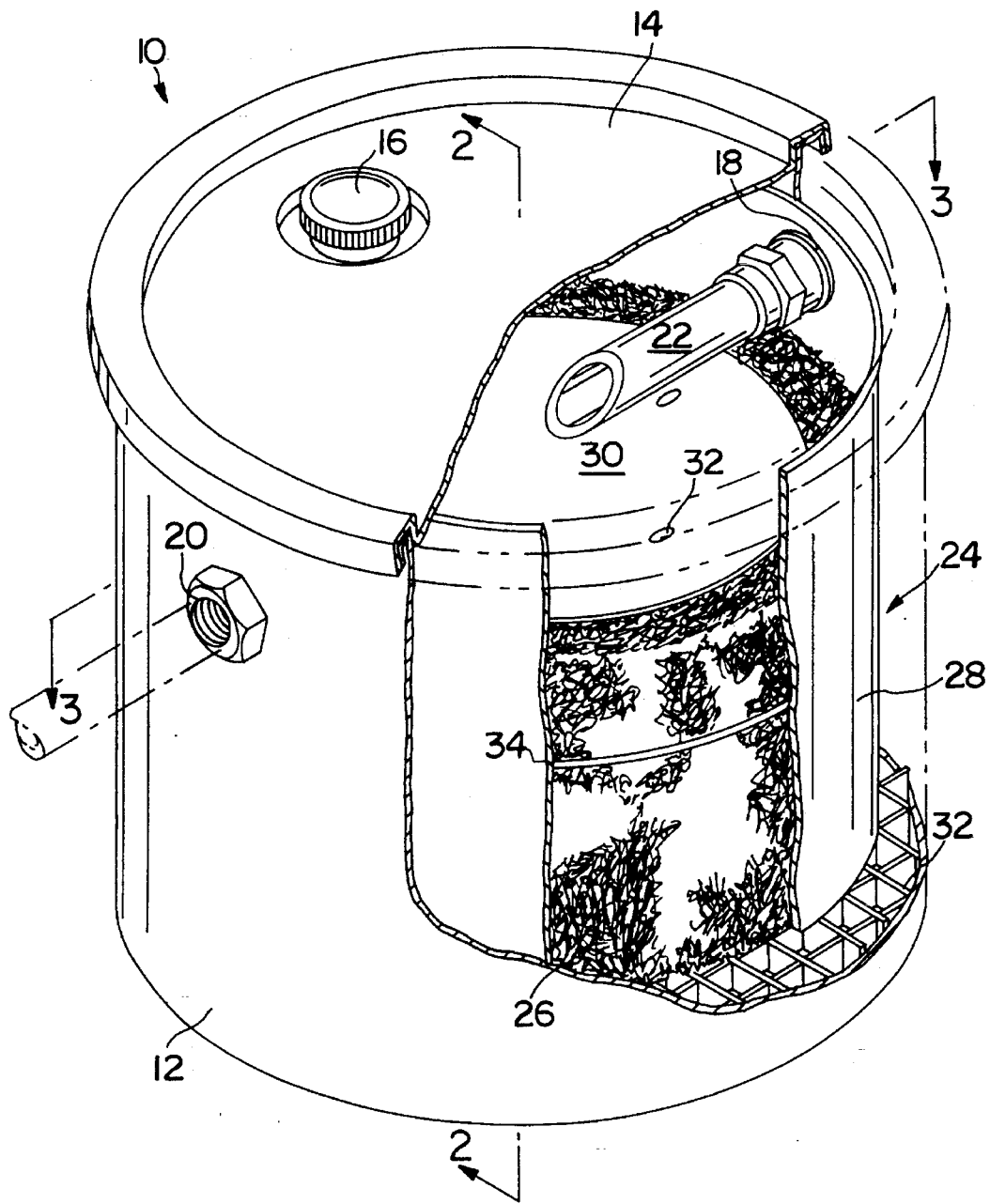
FIG. 1 is a perspective view with cut-away portions of one embodiment of a silver recovery device made in accordance with the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

The present invention is generally directed to a silver recovery device for recovering silver from photographic process fluids. The silver recovery device of the present invention has demonstrated superior results over many prior art constructions. The silver recovery device of the present invention is designed to operate in a reverse flow arrangement meaning that fluids enter the device, filter down through a silver recovery element, and are discharged. In other words, the fluid flows from top to bottom.

Also, the silver recovery device of the present invention includes a dispersing system for dispersing fluids entering the device and as they filter through the silver recovery element. The device of the present invention further includes a silver recovery element made from steel wool that has been mechanically compressed and press fit into an elastic liner. The advantages of these various features and others will become apparent from the detailed description which follows.

Referring to FIG. 1, one embodiment of a silver recovery device made in accordance with the present invention is illustrated generally at 10. Silver recovery device 10 includes an outside container 12 having a removable and sealable lid 14. Outside container 12 can be made, for example, from a bucket having a volume up to about 15 gallons. Optionally, lid 14 can include an inspection aperture 16. Aperture 16 includes a removable cap for viewing the contents of silver recovery device 10. In particular, aperture 16 can be used to inspect device 10 during operation in order to determine whether the device is working properly.

Located on outside container 12 is a fluid inlet 18 and a fluid outlet 20. Fluid inlet 18 and fluid outlet 20 are adapted to receive respective inlet and outlet hoses as are shown in phantom in FIGS. 1 and 2. The inlet and outlet hoses provide a means for carrying fluid to and from silver recovery device 10.

Figure 2:
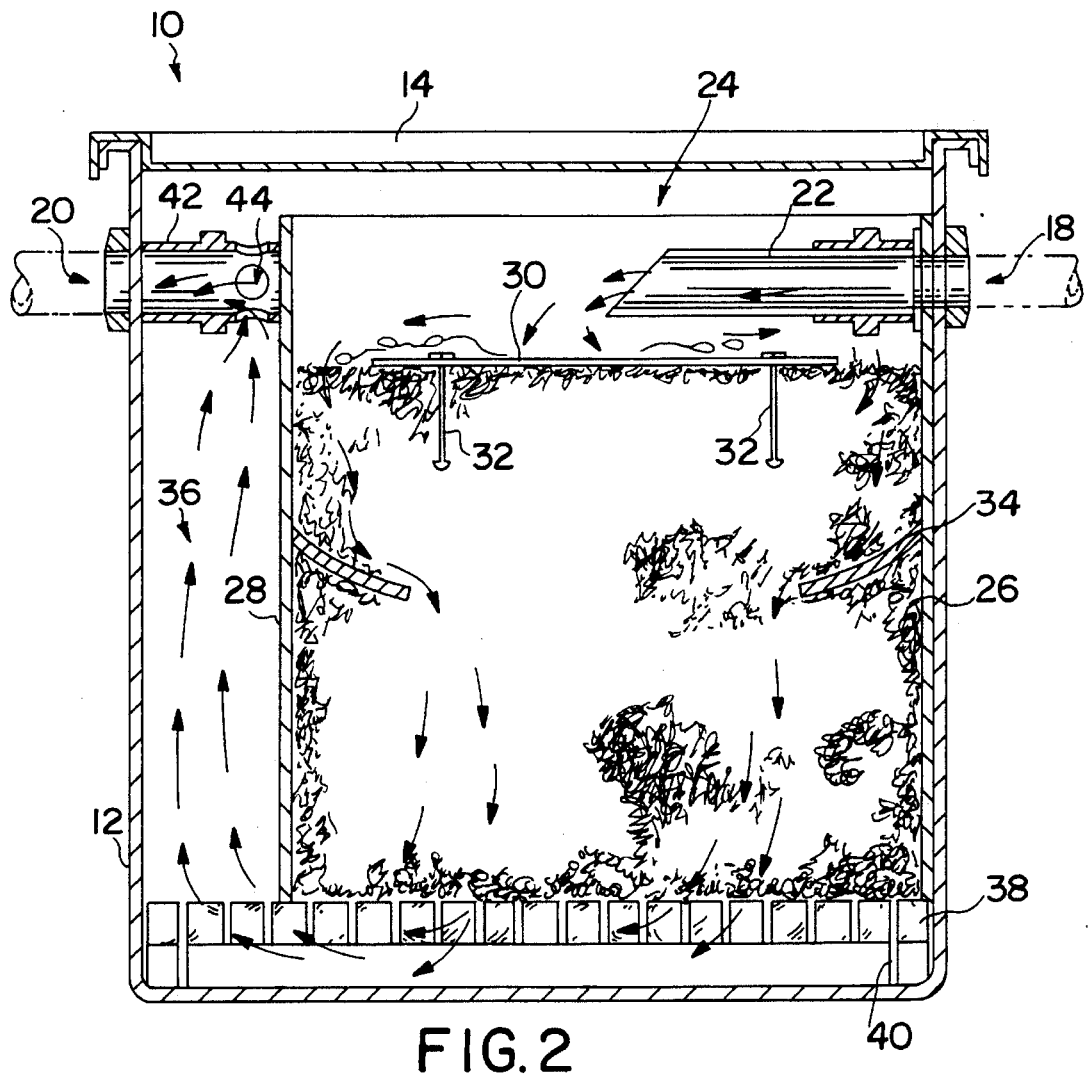
FIG. 2 is a side view with cut-away portions of the embodiment in FIG. 1.

Referring to FIGS. 1 and 2, fluid inlet 18 includes an extension tube 22 which is positioned over a silver recovery cartridge generally 24 which is contained within outside container 12. Silver recovery cartridge 24 includes a silver recovery element 26 surrounded by a liner 28 having an open top and an open bottom. Silver recovery element 26 generally comprises a metal above silver in the electromotive force series capable of undergoing a chemical reaction with the entering fluid for recovering silver therefrom.

Anchored to the top of silver recovery element 26 is a circular drip plate 30. Drip plate 30 can be attached to silver recovery element 26 via attachment hooks 32 as shown in FIG. 2. Drip plate 30 generally has a circumference less than the circumference or perimeter of silver recovery element 26. In this arrangement, fluid enters fluid inlet 18 flows through extension tube 22 and falls upon drip plate 30. The fluid then disperses in multiple directions before entering silver recovery element 26.

Dispersing the fluid before it enters silver recovery element 26 prevents channeling and enhances reaction time within the silver recovery cartridge. The extension tube and drip plate arrangement as shown in the figures provides one means for dispersing the fluid as it enters the silver recovery device. However, any similar means for dispersing fluid as it enters the outside container and falls upon silver recovery element 26 is within the scope of the present invention.

For instance, in another embodiment, fluid inlet 18 could include an extension tube having multiple outlets for dispersing the fluid before falling upon silver recovery element 26. In this embodiment, drip plate 30 would not be necessary.

Figure 3:
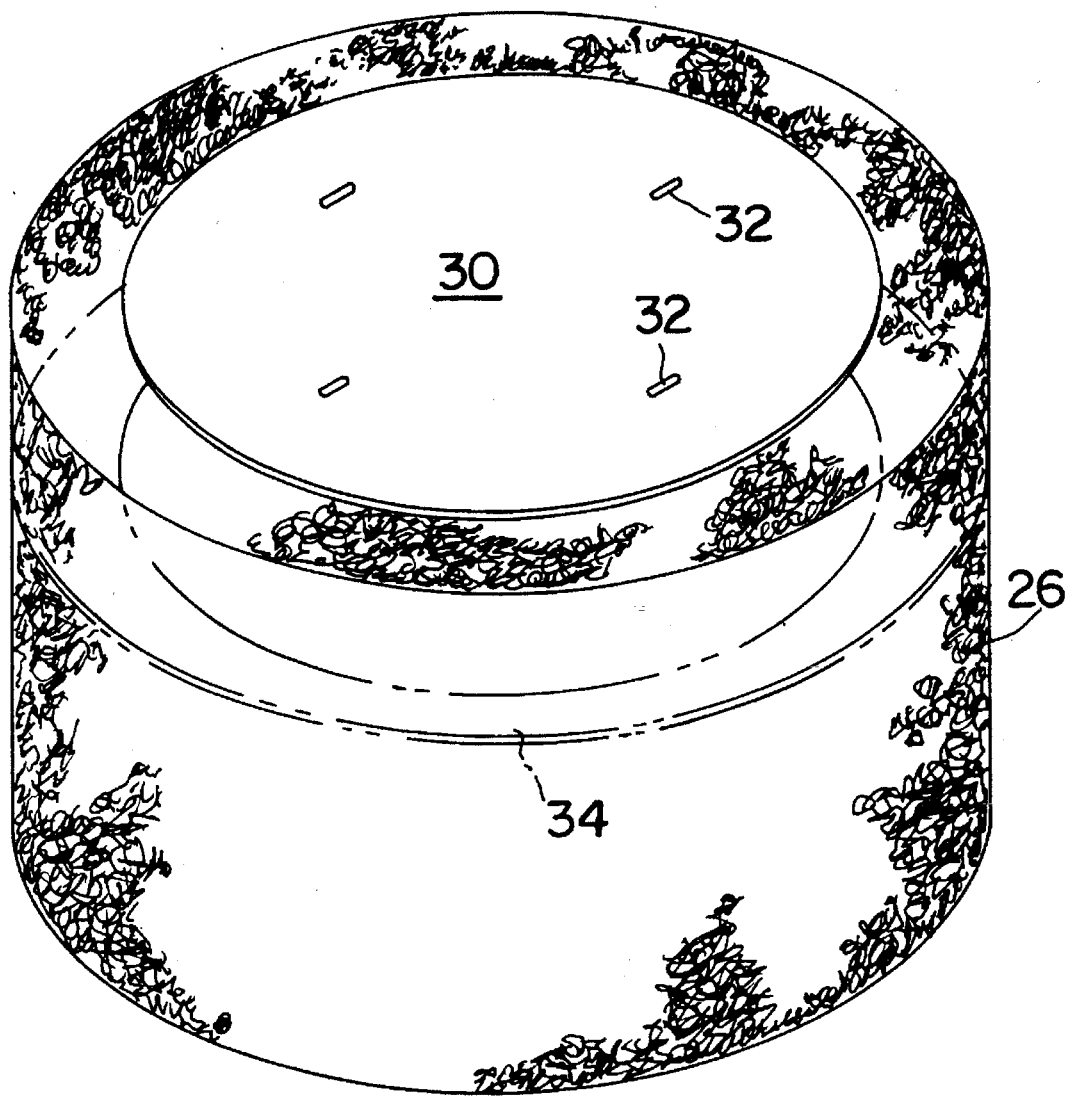
FIG. 3 is a perspective view of a silver recovery element for use in the silver recovery device of the present invention.

As described above, silver recovery cartridge 24 generally comprises a liner 28 surrounding a silver recovery element 26. Silver recovery element 26, as is illustrated in FIG. 3, is made from a metal above silver in the electromotive force series. As such, as a fluid containing silver salts is filtered therethrough, the silver contained within the fluid undergoes a replacement reaction with the metal contained within the silver recovery element. The resultant chemical replacement reaction causes silver to be deposited within recovery element 26 as the metal is dissolved. When the metal is exhausted, the silver recovery element can be removed and processed according to known methods for the recovery of pure silver therefrom.

Preferably, silver recovery element 26 is made from a coil of steel wool fibers. In particular, #4 grade steel wool has been found to be the most effective material for use in the present invention. The fiber diameters for #4 grade wire range between about 0.020 inches and about 0.045 inches.

In a preferred embodiment, the coil of steel wool is compressed and press fit into liner 28. Press fitting silver recovery element 26 into liner 28 provides a number of advantages. First, the compressive force applied to the steel wool increases its density. The increase in density prevents channeling, provides more material per unit volume for reaction with the incoming fluid, and also causes the fluid to filter more slowly through the recovery element. During press fitting, the density of the steel wool is increased more at the circumference or perimeter of silver recovery element 26. Consequently, the incoming fluid is preferably dispersed towards the outer edges of silver recovery element 26. As shown in FIG. 1, drip plate 30, as described above, is one way of accomplishing this goal.

Press fitting silver recovery element 26 into liner 28 also creates a tight fit between the steel wool and the wall of the liner. Press fitting thus prevents the incoming fluid from forming channels at the wall of liner 28 and bypassing silver recovery element 26.

In the silver recovery device of the present invention, liner 28 is preferably made from an elastic material. During press fitting, the steel wool can then be forced into the liner causing the liner to expand. Due to the elastic properties of the liner, the liner maintains a compressive force upon the silver recovery element. During use, as the steel wool is degenerated, the liner retracts maintaining a compressive force upon the silver recovery element. Suitable materials for use as liner 28 include many polymeric materials such as polyolefins.

In one exemplary embodiment, a coil of #4 grade steel wool is obtained. Before press fitting, the density of the coil, for this embodiment, can be between about 0.0118 pounds per cubic inch and about 0.0200 pounds per cubic inch. For press fitting, the coil of steel wool can be loaded through the use of a pneumatic cylinder fitted with a mandrel or any other similar device. The pneumatic cylinder then forces the coil of steel wool through a funnel and into liner 28.

A suitable elastic liner for use in the present invention is a rotomolded liner made from low density polyethylene. Being rotomolded, the liner does not contain a seam which may rupture during press fitting.

The coil of steel wool is then forced into the polyethylene liner by the pneumatic cylinder. Preferably, an amount of steel wool should be forced into the liner causing expansion of the polyethylene tube without causing a rupture. In the past, the polyethylene liner has been subjected to about 10 to 20 pounds per square inch of pressure on its interior. Of course, this range will vary depending upon the material selected for liner 28 and its thickness. Again, preferably the liner is stretched to its maximum limits.

Alternatively, silver recovery cartridge 24 can also include a system of horizontal baffles contained therein for deflecting and dispersing fluid as it filters down through silver recovery element 26. For instance, as shown in FIGS. 1, 2 and 3, silver recovery cartridge 24 can include a baffle 34. Baffle 34 includes a circular plate having a centrally located cut-out portion. The plate is generally coaxial with silver recovery element 26.

Referring to FIG. 2, baffle 34 is preferably made from a thin, flexible, contoured material. Preferably, the outer circumference of the baffle is equal to or slightly greater than the outer circumference of the steel wool. When placed within silver recovery cartridge 24, baffle 34 can bend and extend up the walls of liner 28. As shown, as fluid filters down through silver recovery element 26, baffle 34 deflects the fluid and diverts its path towards the middle of the silver recovery element. Baffle 34 increases the retention time of the fluid within silver recovery element 26 and prevents channeling. In particular, baffle 34 prevents channels from forming at the wall of liner 28.

Baffle 34 can be installed at any predetermined height within silver recovery element 26. Preferably, baffle 34 is positioned approximately at mid height of the silver recovery element. When installing baffle 34 into silver recovery cartridge 24, one-half of silver recovery element 26 can be press fit into liner 28. Baffle 34 can then be placed on top of the press fit steel wool. The top half of silver recovery element 26 can then be press fit into liner 28 on top of baffle 34 for completing the cartridge. In another embodiment, baffle 34 can be installed within the coil of steel wool before it is press fit into liner 28.

As shown in the figures, only one baffle 34 is included within silver recovery device 10. However, depending upon the size of the silver recovery element and the flow rate of the fluid, more baffles can also be installed within the silver recovery element. As is apparent from the figures, if another baffle were added, preferably the baffle would be similar in shape and size to the drip plate for deflecting the flow of fluid to the outside of silver recovery element 26. In other words, in a preferred embodiment, the baffle arrangement used in the present invention would divert the flow of fluid in a "zig-zag" manner through silver recovery element 26.

As shown in FIGS. 1 and 2, liner 28 is in the shape of a tube having an open top and an open bottom. In the embodiment shown, the height of liner 28 is generally greater than the height of silver recovery element 26. This difference in height creates a space at the top of silver recovery cartridge 24 where excess fluid can pool without overflowing from the cartridge into the rest of the container.

As shown in FIG. 2, the liner can be positioned along one wall of outside container 12. Fluid inlet 18 can be placed where liner 28 and outside container 12 are in contact with each other. A nut or bolt can then be used to anchor the liner and the outside container together. In this arrangement, a space is defined between liner 28 and outside container 12 generally illustrated at 36 in FIG. 2. This space forms a passage 36 for allowing fluid to exit silver recovery cartridge 24 and flow out through fluid outlet 20.

As shown in FIGS. 1 and 2, silver recovery cartridge 24 is supported upon a support means 38 within outside container 12. In the embodiment shown in the figures, support means 38 includes a grid made from a polymeric material having at least one support member 40. Support grid 38 elevates silver recovery cartridge 24 off the bottom of outside container 12. Specifically, support grid 38 permits fluid to flow down through silver recovery cartridge 24 and into passage 36 defined by the space between liner 28 and outside container 12.

In a preferred embodiment, support grid 38 supports silver recovery cartridge 24 about one-half inch off the bottom of outside container 12. This height is adequate for allowing fluid to flow therethrough while also allowing room for sediment and other matter to deposit on the bottom of the container without clogging or restricting the flow.

Once the fluid filters down through silver recovery cartridge 24 and up through channel 36, the fluid exits outside container 12 through fluid outlet 20. As shown in FIG. 2, fluid outlet 20 can include an outlet tube 42 having a plurality of apertures or openings 44. Preferably, fluid outlet 20 is located at a height on outside container 12 just below the top of liner 28. Fluid outlet 20 at this height further insures a maximum retention time for processing fluids within silver recovery device 10. However, if desired, fluid outlet can be positioned at any location on outside container 12 as long as it is below the height of liner 28.

In the embodiment illustrated, outlet tube 42 is included which extends from fluid outlet 20 to liner 28 where the width is the greatest between liner 28 and outside container 12. By resting against liner 28, outlet tube 42 further positions silver recovery cartridge 24 within silver recovery device 10. Apertures 44 are then provided to direct the flow of fluid outside silver recovery device 10.

One important feature of the present invention is that the flow of fluid through silver recovery device 10 is in a reverse flow arrangement which is in contrast to many prior art constructions. Diagramming the flow of fluid through silver recovery device 10 of the present invention, the fluid first enters fluid inlet 18 and flows through extension tube 22. The fluid falls upon drip plate 30 and disperses into silver recovery element 26. While filtering through silver recovery element 26, liner 28 maintains the fluid within the recovery element while baffle 34 further disperses the fluid as it flows therethrough. Once filtered through silver recovery element 26 the processed fluid then flows through support grid 38 and into passage 36. From passage 36, the fluid flows into outlet tube 42 and exits out through fluid outlet 20.

Many prior art constructions disclose a forward flow arrangement in which the fluid flows from the bottom to the top of a silver recovery media. However, in these devices, the most concentrated fluid contacts the bottom of the silver recovery media where most of the silver replacement occurs. Instead of being deposited within the silver recovery media, the precipitated silver falls to the bottom of the container which can clog and block the flow of fluid. In the silver recovery device of the present invention, on the other hand, most of the replacement reaction occurs at the top of silver recovery element 26. Consequently, the precipitated silver becomes trapped within the silver recovery cartridge producing much less sediment on the bottom of the container.

As such, in the apparatus of the present invention, the fluid upon entering outside container 12 immediately filters down through silver recovery element 26. However, if desired, the flow of fluid through silver recovery device 10 can be reversed.

The materials used to construct the silver recovery device of the present invention, excluding the silver recovery element, can be made from any material that does not react with the fluids being processed or that inhibit the efficiency of the device. Preferably, polyolefins such as polyethylene, polypropylene and polystyrene are used.

Unexpectedly, the device of the present invention has been found to be superior over many prior art constructions.

In particular, the device of the present invention has been proven to be much more efficient in recovering silver from fluids. In particular, the device of the present invention has been able to meet and surpass many federal silver discharge limitations. In addition, the silver recovery device has also been found useful in recovering silver from color photography processing fluids which is not possible in many prior art constructions.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. A device for recovering silver from fluids which contain silver therein, said device comprising:

an outside container defining a fluid inlet positioned a predetermined distance from the top of said container and a fluid outlet;

a silver recovery cartridge contained within said outside container, said cartridge being received within said outside container such that a space is defined therebetween, and wherein said cartridge is positioned in relation to said fluid inlet such that fluid entering said outside container may contact said cartridge and filter down through, said silver recovery cartridge comprising an elastic tubular liner having an open top and an open bottom, said liner surrounding a silver recovery element containing a metal above silver in the electromotive force series, said silver recovery element being forcibly packed within said tubular liner such that said recovery element applies a pressure of at least about 10 pounds per square inch to the interior surface of said liner; and support means for supporting said silver recovery cartridge within said outside container, wherein fluid may flow from said recovery cartridge through said support means and out said fluid outlet.

2. The silver recovery device as defined in claim 1, wherein said outside container comprises a bucket having a volume of up to about 12 gallons, said bucket including a removable and sealable lid.

3. The silver recovery device as defined in claim 1, further comprising fluid dispersing means in communication with fluid entering said fluid inlet for dispersing the fluid in multiple directions before the fluid contacts said silver recovery cartridge.

4. The silver recovery device as defined in claim 3, wherein said fluid dispersing means includes an extension tube extending from said inlet to a position generally above the center of said silver recovery cartridge and a drip plate located below said extension tube, wherein fluid enters said inlet, flows through said extension tube, and contacts said drip plate before falling upon said silver recovery element.

5. The silver recovery device as defined in claim 1, wherein said fluid outlet is located on said outside container at a predetermined height such that said fluid outlet is lower than said open top of said liner.

6. The silver recovery device as defined in claim 1, wherein said silver recovery element comprises compressed steel wool.

7. The silver recovery device as defined in claim 1, wherein said elastic liner is liquid impervious for maintaining filtering fluid within said silver recovery cartridge.

8. The silver recovery device as defined in claim 1, wherein said silver recovery cartridge contains at least one baffle means for deflecting the flow of fluid filtering through said cartridge.

9. The silver recovery device as defined in claim 8, wherein said at least one baffle means comprises a plate coaxial with said silver recovery element having a centrally located cutout portion.

10. An improved silver recovery device for recovering silver from fluids, said device including an outside container defining a fluid inlet and a fluid outlet for receiving and discharging fluids respectively, said device further including a silver recovery cartridge received within said outside container, said cartridge containing a metal above silver in the electromotive force series adapted to undergo a replacement reaction with silver contained in the fluid being processed, said improvement comprising:

a liner surrounding said metal, said metal being forcibly loaded into said liner causing said liner to apply a compressive force of at least about 10 pounds per square inch thereto, said compressive force preventing the formation of channels within said metal and causing fluid to filter more slowly through said silver recovery cartridge.

11. The silver recovery device as defined in claim 10, wherein said liner has an open top and an open bottom.

12. The silver recovery device as defined in claim 10, further comprising at least one horizontal baffle contained within said silver recovery cartridge for diverting the flow of fluid through said metal.

13. The silver recovery device as defined in claim 12, wherein said at least one baffle comprises a plate having a centrally located cutout portion, said plate being located within said silver recovery cartridge at approximately mid height.

14. The silver recovery device as defined in claim 10, further comprising fluid dispersing means in communication with fluid entering said fluid inlet for dispersing the fluid in multiple directions before the fluid contacts said silver recovery cartridge.

15. The silver recovery device as defined in claim 14, wherein said fluid dispersing means includes an extension tube extending from said inlet and a drip plate located on top of said silver recovery cartridge, wherein fluid enters said inlet, flows through said extension tube, and falls upon said drip plate before filtering through said silver recovery cartridge.

16. The silver recovery device as defined in claim 10, wherein said metal comprises compressed steel wool that has been press fit into said liner, said liner being made from a seamless elastic polymeric material.

17. The silver recovery device as defined in claim 16, wherein said compressed steel wool has a fiber diameter between about 0.045 inches and about 0.020 inches.

18. A device for recovering silver from photographic processing fluids, said device comprising:

an outside container defining a fluid inlet, wherein said fluid inlet is adapted to receive a respective inlet hose for carrying fluid to said container;

a silver recovery element enclosed within said outside container, said silver recovery element having a top and a bottom and positioned within said container such that fluid entering said fluid inlet falls upon said top of said recovery element, said silver recovery element comprising compressed steel wool, wherein, when fluid filters through said recovery element, silver contained within the fluid undergoes a replacement reaction with iron contained within said steel wool;

fluid dispersing means in communication with fluid entering said fluid inlet for dispersing the fluid in multiple directions before the fluid contacts said silver recovery element;

an elastic tubular liner surrounding and applying a compressive force of at least about 10 pounds per square inch to said silver recovery element, said liner having an open top and an open bottom for allowing fluid to filter therethrough;

support means for supporting said silver recovery element in said liner within said container; and a fluid outlet defined by said outer container and adapted to receive an outlet hose, said fluid outlet being located on said outside container at a predetermined height below the top of said tubular liner.

19. The silver recovery device as defined in claim 18, wherein said fluid dispersing means includes an extension tube extending from said inlet and a drip plate located on top of said silver recovery element, wherein fluid enters said inlet, flows through said extension tube, and falls upon said drip plate before filtering through said silver recovery element.

20. The silver recovery device as defined in claim 19 further comprising at least one baffle contained within said silver recovery element, said at least one baffle comprising a plate having a centrally located cutout portion, said plate being located within said silver recovery element at approximately mid height.

21. The silver recovery device as defined in claim 18, wherein said compressed steel wool has a fiber diameter between about 0.02 inches and about 0.05 inches.

22. The silver recovery device as defined in claim 18, wherein said support means includes a grid having at least one support member such that fluid filters through said silver recovery element, falls through said grid, and flows outside said liner to said outlet.

* * * * *